(12) United States Patent
Homeijer et al.

(10) Patent No.: US 9,027,402 B2
(45) Date of Patent: May 12, 2015

(54) ERROR CORRECTION IN ACCELERATION-SENSING DEVICES

(75) Inventors: Brian D. Homeijer, Corvallis, OR (US); Robert N. Bicknell, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 396 days.

(21) Appl. No.: 13/643,883

(22) PCT Filed: Apr. 30, 2010

(86) PCT No.: PCT/US2010/033127
§ 371 (c)(1),
(2), (4) Date: Oct. 26, 2012

(87) PCT Pub. No.: WO2011/136793
PCT Pub. Date: Nov. 3, 2011

(65) Prior Publication Data
US 2013/0036789 A1   Feb. 14, 2013

(51) Int. Cl.
*G01P 15/125* (2006.01)
*G01P 21/00* (2006.01)
*G01P 15/08* (2006.01)

(52) U.S. Cl.
CPC ............... *G01P 15/125* (2013.01); *G01P 21/00* (2013.01); *G01P 2015/0814* (2013.01)

(58) Field of Classification Search
CPC ..... G01P 15/08; G01P 15/0802; G01P 15/12; G01P 15/125; G01P 15/13; G01P 15/131
USPC ........................................................ 73/514.18
See application file for complete search history.

(56) References Cited

U.S. PATENT DOCUMENTS

| | | | |
|---|---|---|---|
| 4,584,885 A * | 4/1986 | Cadwell | 73/862.61 |
| 5,440,939 A * | 8/1995 | Barny et al. | 73/862.61 |
| 5,473,946 A | 12/1995 | Wyse et al. | |
| 5,565,625 A * | 10/1996 | Howe et al. | 73/514.16 |
| 6,374,672 B1 | 4/2002 | Abbink et al. | |
| 6,536,280 B1 * | 3/2003 | Carley | 73/504.02 |
| 7,444,868 B2 | 11/2008 | Johnson | |

(Continued)

FOREIGN PATENT DOCUMENTS

| | | |
|---|---|---|
| JP | 2007093615 | 4/2007 |
| JP | 2009503530 | 1/2009 |

OTHER PUBLICATIONS

The International Search Report and the Written Opinion of the International Searching Authority for International App No. PCT/US2010/033127 dated Jan. 27, 2011, 8 pages.

*Primary Examiner* — Peter Macchiarolo
*Assistant Examiner* — Nathaniel Kolb
(74) *Attorney, Agent, or Firm* — Hewlett-Packard Patent Department

(57) ABSTRACT

An acceleration-sensing device having error correction includes a stator having at least one conductor affixed to a surface and a proof mass having a first conductor affixed at a first location relative to the at least one conductor affixed to a surface of the stator. The proof mass includes a second conductor affixed at a second location relative to the at least one conductor affixed to a surface of the stator, wherein an excitation signal applied to the first conductor of the proof mass brings about a force on the proof mass in the plane of motion of the proof mass that is substantially equally opposed by a force resulting from an excitation signal applied to the second conductor of the proof mass in the plane of motion of the proof mass.

15 Claims, 9 Drawing Sheets

(56) References Cited

U.S. PATENT DOCUMENTS

| | | | |
|---|---|---|---|
| 7,484,411 B2* | 2/2009 | Walmsley | 73/514.32 |
| 2005/0241394 A1 | 11/2005 | Clark | |
| 2007/0204693 A1 | 9/2007 | Chernyak et al. | |
| 2008/0178674 A1* | 7/2008 | Walmsley | 73/514.01 |
| 2009/0255336 A1 | 10/2009 | Horning et al. | |

* cited by examiner

ERROR CORRECTION IN ACCELERATION-SENSING DEVICES

BACKGROUND

A device for measuring acceleration can be constructed using a proof mass and a stator which remains stationary relative to the proof mass as the mass moves in response to an acceleration. As the mass moves relative to the stator, signals induced on a conductor located on the surface of the stator undergo a measurable change relative to excitation signals present on a conductive surface of the proof mass. From these induced signals, a signal processor determines the acceleration that the proof mass has undergone.

However, when excitation signals are generated on the conductor located on the surface of the proof mass, the mass may undergo movement relative to the stator even without the mass undergoing an acceleration. This movement may be caused by the interaction between the electric fields generated by the excitation current present on a surface of the proof mass and an electric field resulting from currents induced on a surface of the stator. The resulting movement of the proof mass causes errors in the measurement of acceleration.

DESCRIPTION OF THE EMBODIMENTS

Embodiments of the invention provide acceleration sensing with increased accuracy. In one embodiment, a proof mass and stator are each divided into two portions. A first portion of the proof mass and the stator are used to sense the displacement of the proof mass as the mass undergoes an acceleration. This sensing is performed by determining the capacitance between at least one conductor present on the proof mass and at least one corresponding conductor present on the stator. This process begins with an excitation voltage applied to the conductor of the proof mass. In one embodiment, amplitude of the signal induced on a conductive surface of the stator is then measured. In another embodiment of the invention, an excitation voltage is applied to the conductor on the stator and the amplitude of the signal induced on a conductive surface of the proof mass is measured.

However, the inventors have determined that the excitation voltage applied to the conductor of the proof mass can cause the proof mass to be displaced even when the proof mass is not undergoing an acceleration. The inventors contemplate that this displacement is brought about by the interaction between the electric field that results from the excitation current present on a surface of the proof mass and the electric field that results from a sensing current induced on a conductive surface of the stator. Embodiments of the invention seek to provide a substantially equal and opposite force that functions to remove this displacement of the proof mass thereby enhancing the accuracy of the acceleration measurement.

Figure 1:
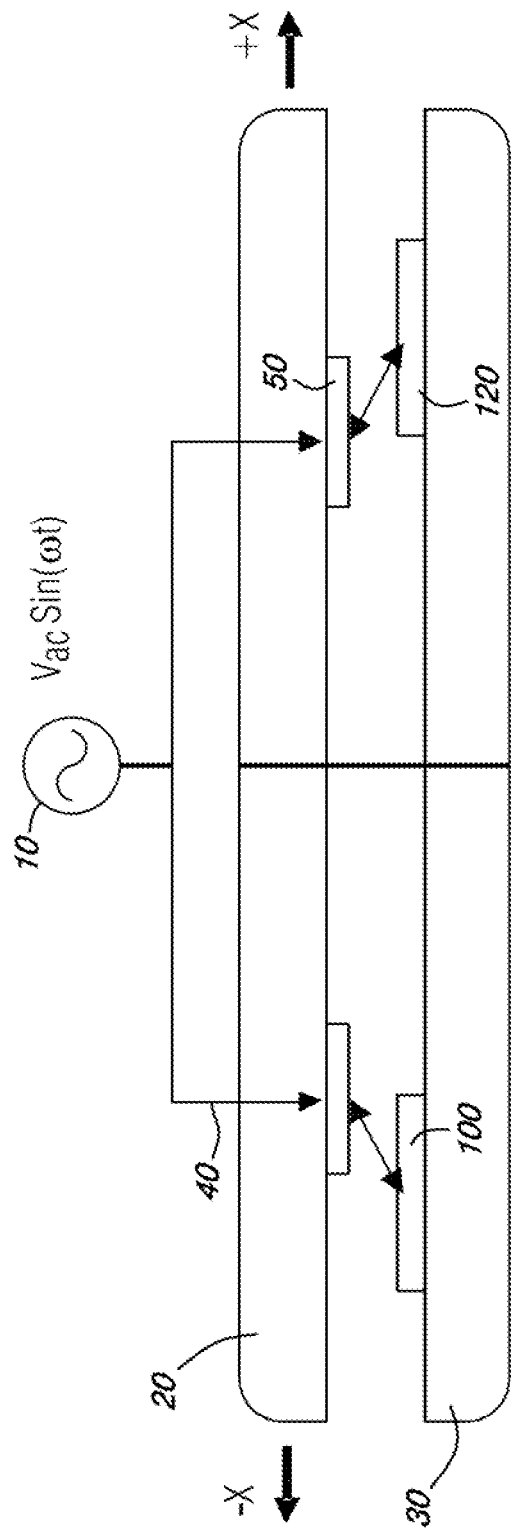
FIG. 1 is a diagram showing components of an acceleration-sensing device having error correction according to an embodiment of the invention.

FIG. 1 is a diagram showing the basic components of an acceleration-sensing device having error correction according to an embodiment of the invention. In FIG. 1, AC voltage source 10 generates a sinusoidal signal which is conveyed to conductors 40 and 50 located at the bottom of proof mass 20. In other embodiments of the invention, AC voltage source 10 may generate any one of numerous types of periodic signals such as a square wave that are coupled to the conductors present on the bottom surface of proof mass 20. In one embodiment of the invention, for example, AC voltage source 10 may generate a succession of pulses, or may generate a composite signal consisting of sinusoidal waveforms of varying frequencies.

In response to an electrical current generated on conductor 40, an electric field is generated which extends outward from the conductor. As proof mass 20 moves in the +x and −x direction, as shown by the arrows to the sides of proof mass 20, the portion of the electric field from conductor 40 that is coupled to conductor 100 atop stator 30 varies along with this motion. However, in many embodiments of the invention, it is the in-plane force (that is, the component of the electric field in the +x and −x direction that is of interest. Thus, when proof mass 20 moves in a −x direction, which may be caused when the proof mass undergoes an acceleration in the +x direction, the in-plane component of the electric field coupled from conductor 40 to conductor 100 can be expected to decrease to a minimum amount when conductor 40 is directly above conductor 100. As conductor 40 continues to move in the −x direction, eventually in a direction away from conductor 100, the electric field coupled to conductor 100 can be expected to increase.

Figure 2:
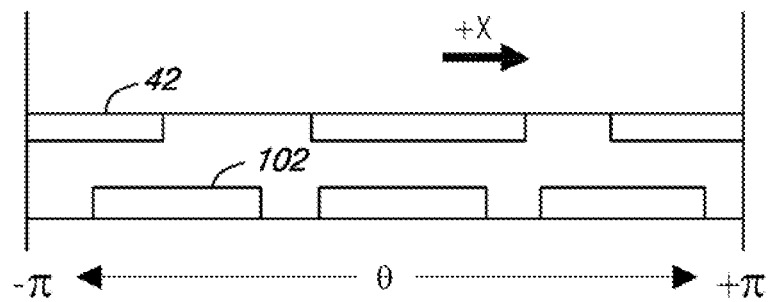
FIG. 2 shows a coordinate system of in which displacements in the ±x direction can be expressed in an angular measurement according to an embodiment of the invention.

FIG. 2 shows a coordinate system in which displacements in the +x direction can be expressed as an angular measurement (θ) according to an embodiment of the invention. In the embodiment of FIG. 2, the inventors contemplate a periodic structure in which conductors 42 and 102 are repeated in the ±x direction. Thus, as conductor 42 moves in the ±x directions, the angle θ moves between −π and −π.

Referring to FIG. 2, when a voltage difference exists between two conductors, such as between conductor 40 and conductor 100, the force between the two conductors in the plane of motion (such as when the motion is in the ±x direction) can be described as:

$$F_x = \frac{1}{2} \frac{d_{partial} C}{d_{partial} x} V_c^2$$

In which "$d_{partial}$" invokes the partial differential operator in the x axis.

Thus, as the excitation voltage is increased, the attractive force between the conductors of the proof mass and the stator increases with the square of the voltage. Further, it can also be seen that there is a linear relationship between the capacitance and the force between the conductors and an inverse relationship between the distance between the conductors and the force. These forces have been identified using the arrows between conductors 40 and 100 and FIG. 1. Although not shown in the Figures, the inventors contemplate that a restoring force is provided by a spring or other elastic component.

Accordingly, for the geometry of FIG. 2, as conductors 40 move relative conductor 100 in the ±x direction, the force that each conductor exerts on the other increases and decreases. For larger displacements in the ±x direction, corresponding to larger values of ±θ, the forces exerted between the two conductors decreases. For small displacements in the ±x direction, corresponding to larger values of ±θ, the forces exerted between the two conductors increases.

Figure 3:
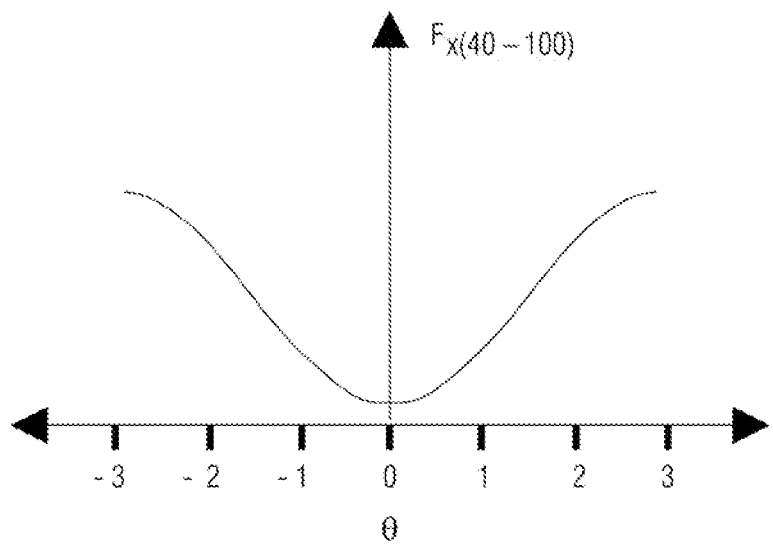
FIG. 3 shows the forces exerted between two conductors according to an embodiment of the invention.

FIG. 3 shows the forces exerted between conductor 40 located on proof mass 20 and conductor 100 located on stator 30 according to an embodiment of the invention. As can be seen in FIG. 3, at least for small displacements, the forces exerted between these conductors (as shown in FIG. 3 by the quantity $F_{x(40-100)}$) varies as a roughly sinusoidal function having a minimum at θ=0.

Returning now to FIG. 1, conductor 50 is also located on a bottom surface of proof mass 20. Additionally, conductor 120 is located on a top surface of stator 30. The two-sided arrow in FIG. 1 shows the force exerted between conductors 50 and 120. From FIG. 1, it can be seen that the forces exerted between conductors 40 and 100 can be equally opposed in the x direction (and thus canceled) by the force exerted between conductors 50 and 120. This is to say that, at least for small displacements of proof mass 20, the quantity $F_{x(40-100)} = -F_{x(50-120)}$. Thus, when a positive excitation voltage is applied to conductors 40 and 50 causing a current to be induced at conductor 100, the resulting attractive force (acting in the −x direction) is canceled by the attractive force (acting in the +x) between conductors 50 and 120.

Figure 4:
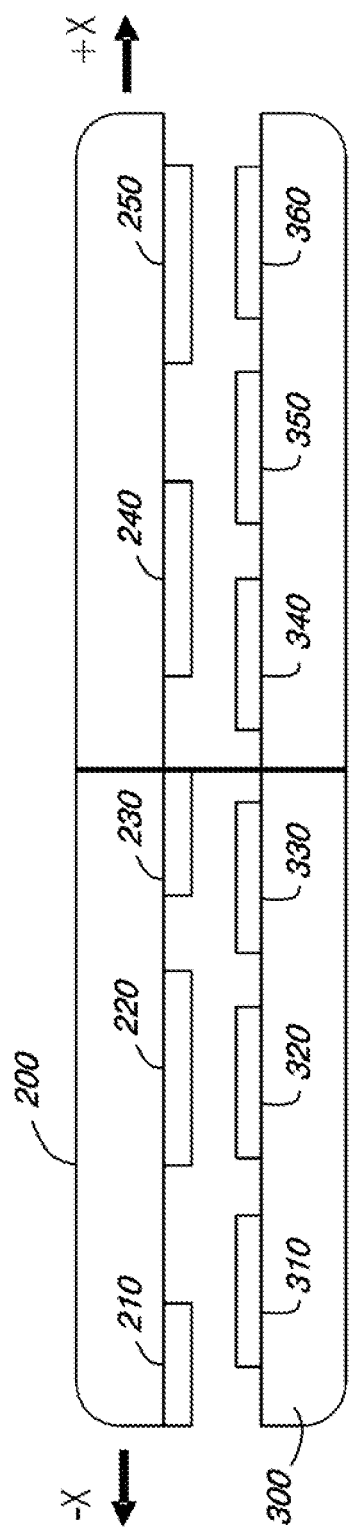
FIGS. 4-5 show diagrams of a proof mass and stator mass having additional conductive surfaces on each according to embodiments of the invention.

FIG. 4 is a diagram of a proof mass and stator having additional conductive surfaces on each according to an embodiment of the invention. FIG. 4 makes use of the force cancellation concept discussed with reference to FIG. 1 and makes use of a coordinate system identical to that described with reference to FIGS. 2 and 3. As will be discussed hereinafter, the layout of FIG. 4 provides force cancellation caused by the excitation voltages applied to conductors on the proof mass over a much broader range of displacements in the ±x dimension. In FIG. 4, proof mass 200 includes conductors 210, 220, 230, 240, and 250 located on a bottom surface of the proof mass. Stator 300 includes conductors at 310, 320, 330, 340, 350, and 360 located on a top surface of the stator.

Figure 5:
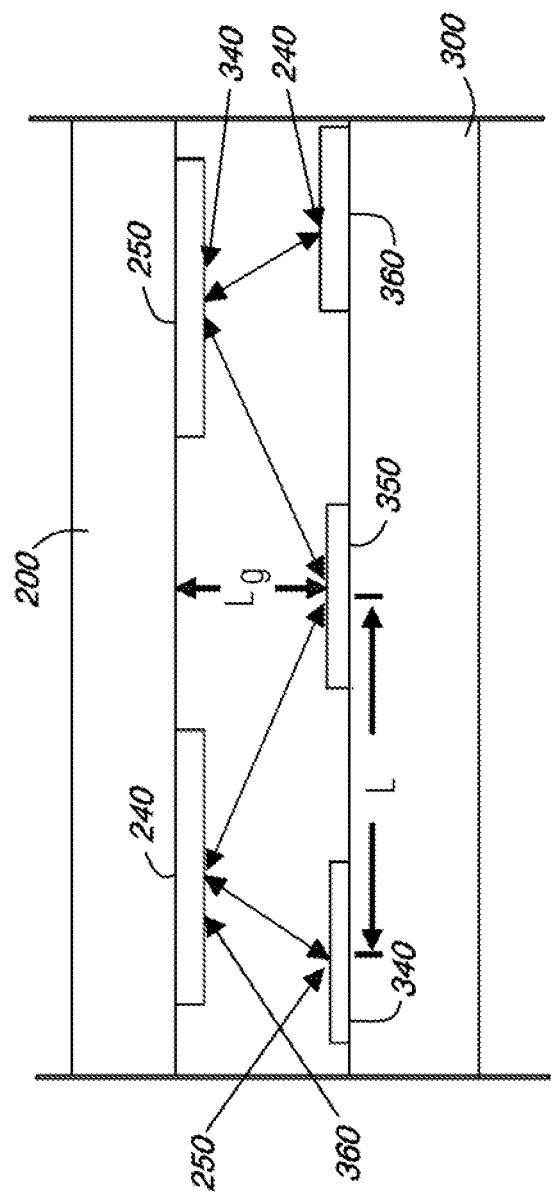

FIG. 5 shows a portion of the proof mass and stator arrangement of FIG. 4 according to an embodiment of the invention. The inventors contemplate that the proof mass and stator arrangement of FIG. 5 is repeated in both directions across a substrate. The inventors further contemplate that the ratio of the gap width (shown as dimension $L_g$ in FIG. 5) divided by the interconductor spacing (shown as dimension L) in the Figure should approximate 1. Thus, for an interconductor spacing of 1μ, the gap width ought to approach 1μ as well. Similar to previous embodiments of the invention discussed herein, the acceleration of proof mass 200 can be determined by way of detecting changes in capacitance between conductor 240 and conductors 340, 350, and at 360, and between conductor 250 and conductors 340, 350, and 360. Accordingly, as shown by the arrows in FIG. 5, six distinct capacitances exist between the two conductors present on proof mass 200 and the three conductors present on stator 300. As proof mass 200 moves relative to stator 300, the angle (θ) between each conductor of the proof mass and each conductor of the stator varies (as previously described generally in FIG. 2).

Figure 6:
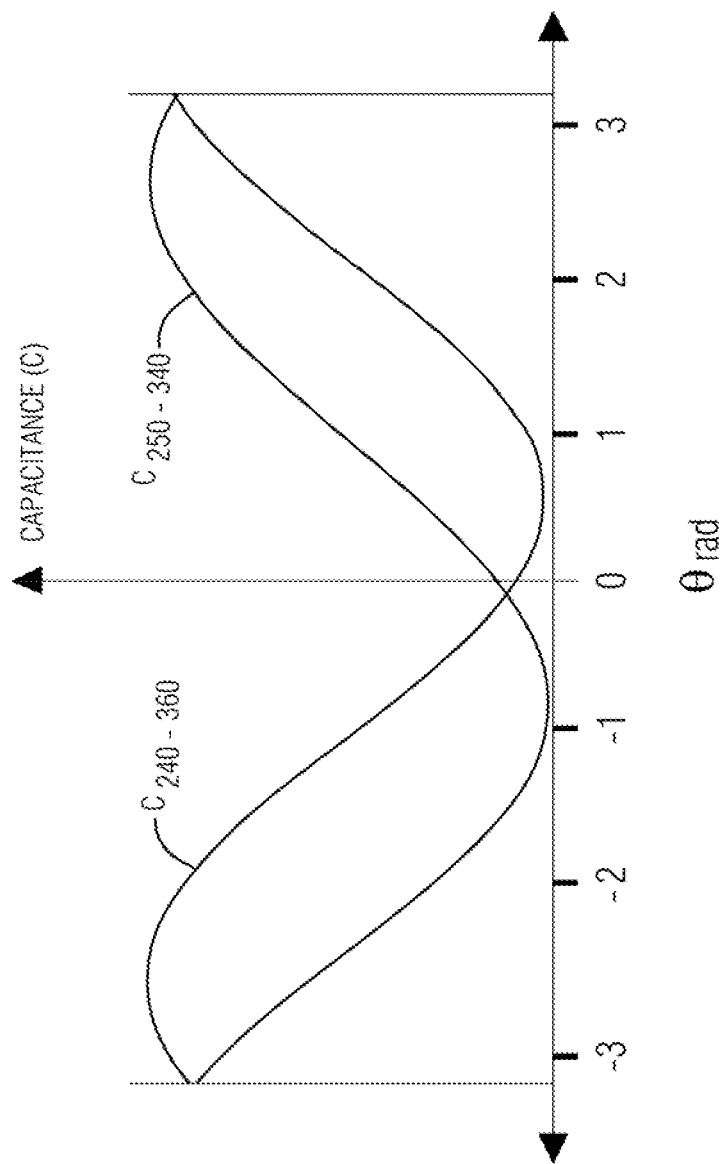
In FIG. 6, an exemplary pair of capacitances between a conductor of a proof mass and stator of FIG. 5 is shown.

In FIG. 6, an exemplary pair of capacitances between a conductor of proof mass 200 and a conductor of stator 300 FIG. 5 is shown. As mentioned with reference to FIG. 5, a total of six capacitances between the conductors of proof mass 200 and stator 300 are possible; however, for simplicity of illustration, only two capacitances are shown as a function of the angle θ. Although the capacitances shown in FIG. 6 may not be completely to scale, it can be seen that these capacitances vary as an approximately sinusoidal function of angle θ.

Figure 7:
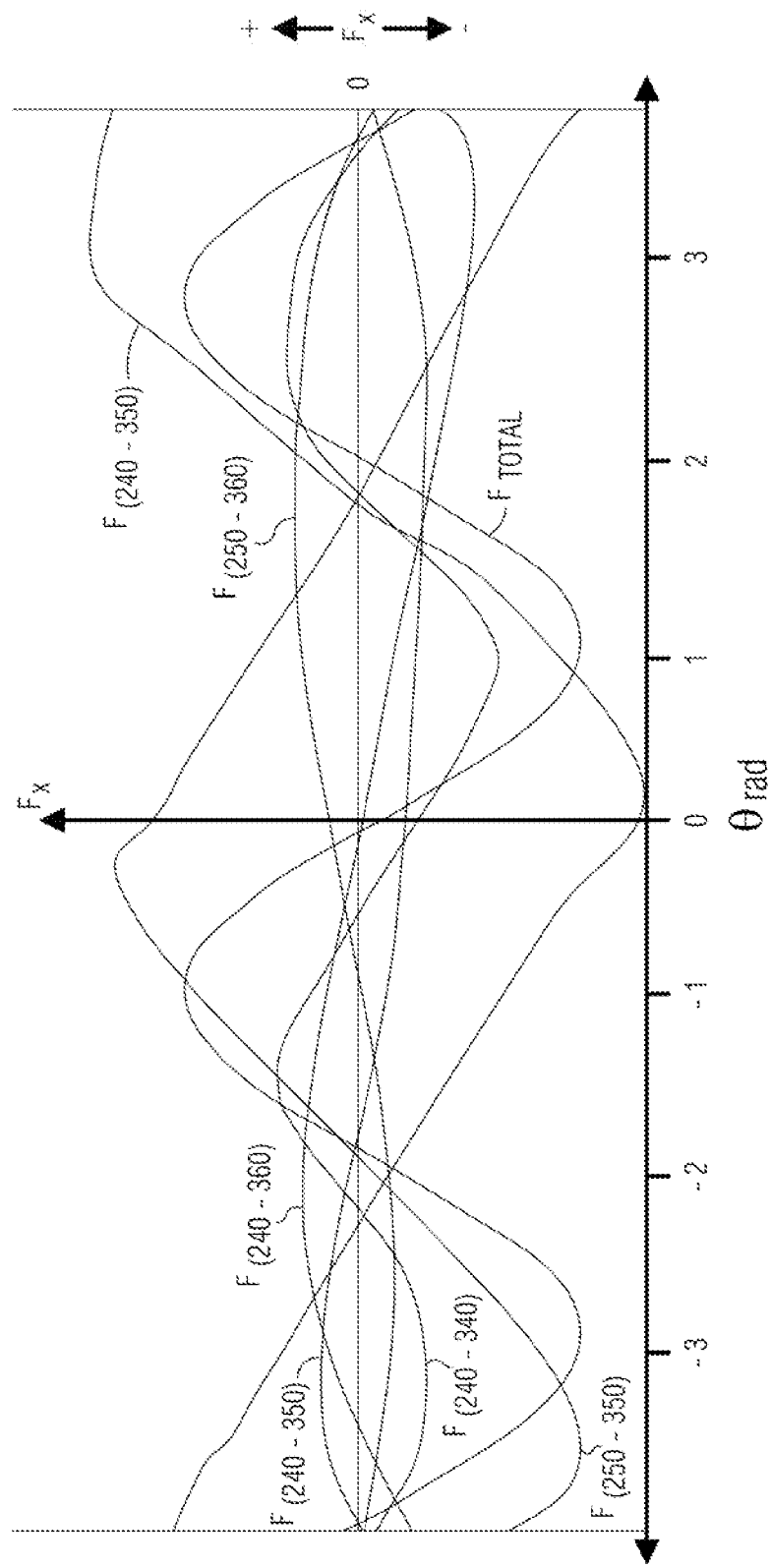
FIG. 7 shows the individual force contributions as a function of angle θ resulting from an exemplary excitation voltage being applied to the conductors of FIG. 5.

FIG. 7 shows the individual force contributions as a function of angle θ resulting from an exemplary excitation voltage being applied to conductors 240 and 340. As can be seen, the individual force contributions can be difficult to characterize using periodic functions. It can also be seen that as conductors on the proof mass move relative to conductors on the stator, the individual force contributions ($F_x$) assume positive and negative values. Shown in FIG. 7 are: $F_{x(240-350)}$, $F_{x(240-360)}$, $F_{x(240-340)}$, $F_{x(250-360)}$, $F_{x(250-350)}$, and $F_{x(240-350)}$. FIG. 7 also shows the summation of these forces as $F_{total}$.

Figure 8:
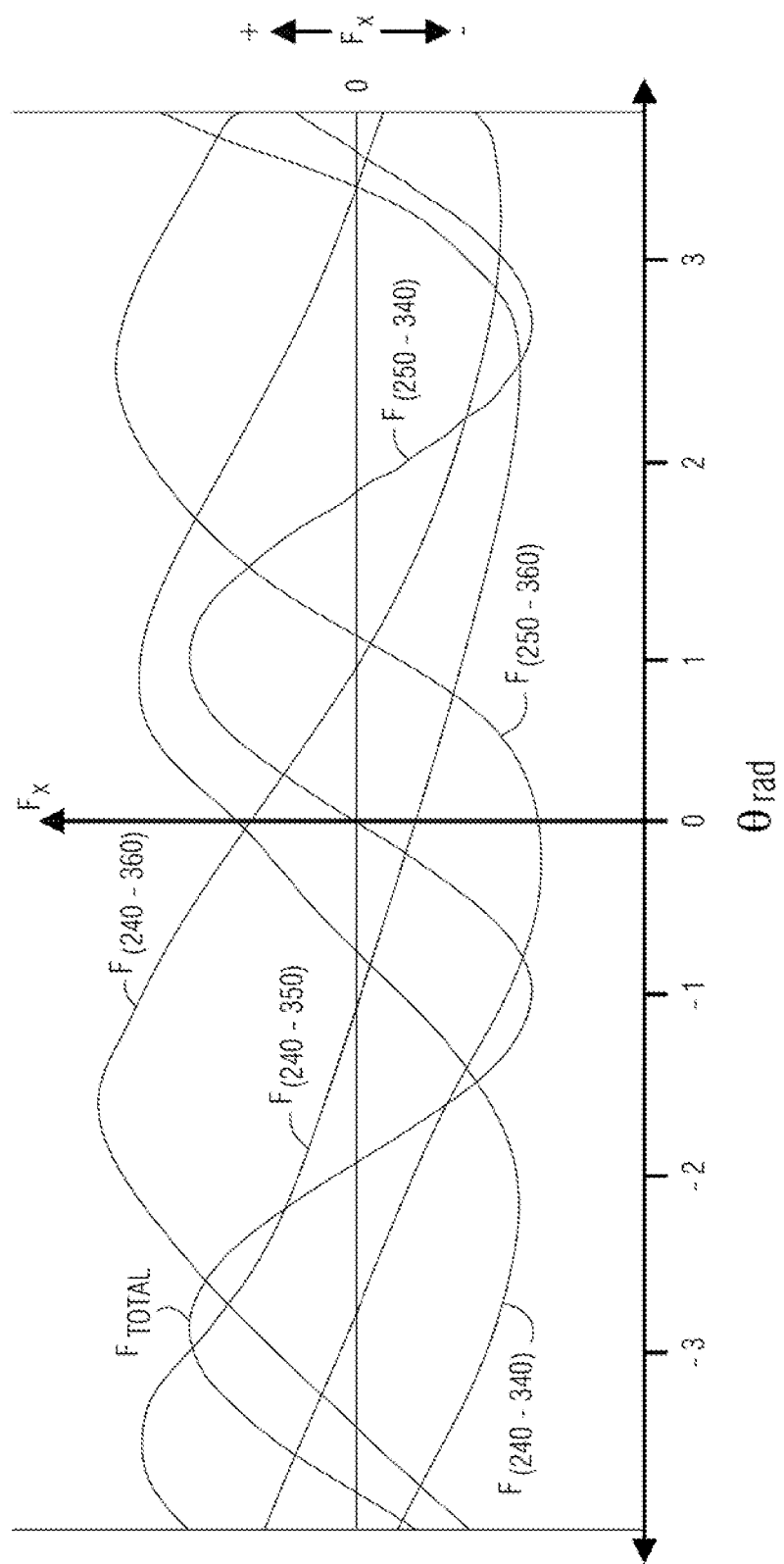
FIG. 8 shows the individual force contributions from a cancellation force according to an embodiment of the invention.

FIG. 8 shows the individual force contributions from a cancellation force according to an embodiment of the invention. FIG. 8 results from a displacement in the +x dimension that results from an angle θ of π/2 radians. In the embodiment of FIG. 5, such a shift might place conductor 240 directly above conductor 350. Shown in FIG. 8 are: $F_{x(240-360)}$, $F_{x(240-350)}$, $F_{x(240-340)}$, $F_{x(250-360)}$, $F_{x(250-340)}$, under these conditions. Shown also in FIG. 8 is the summation of these six forces shown by $F_{total}$. It should be noted that $F_{total}$ of FIG. 8 is substantially 180 degrees (π) radians out of phase with $F_{total}$ of FIG. 7.

Figure 9:
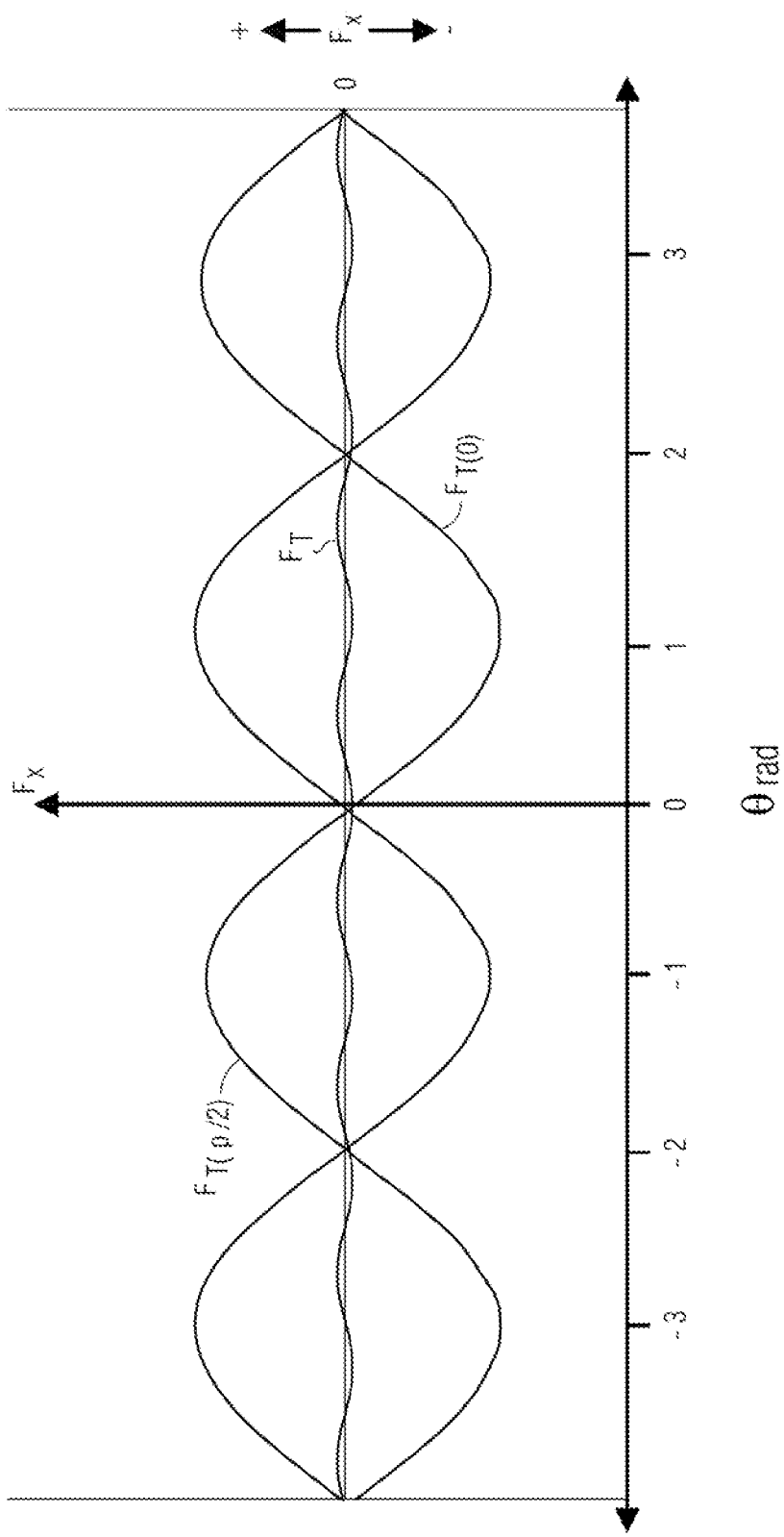
FIG. 9 shows the $F_{total}$ waveforms of FIGS. 7 and 8 along with a summation of these waveforms ($F_T$) according to an embodiment of the invention.

FIG. 9 shows the $F_{total}$ waveforms of FIGS. 7 and 8 along with a summation of these waveforms ($F_T$) according to an embodiment of the invention. As described in reference to the preceding figures, the summation of forces that results in the near-zero tendency of $F_T$ can be achieved by offsetting a portion of the conductors of the proof mass by an amount of θ=90 degrees (π/2).

Figure 10:
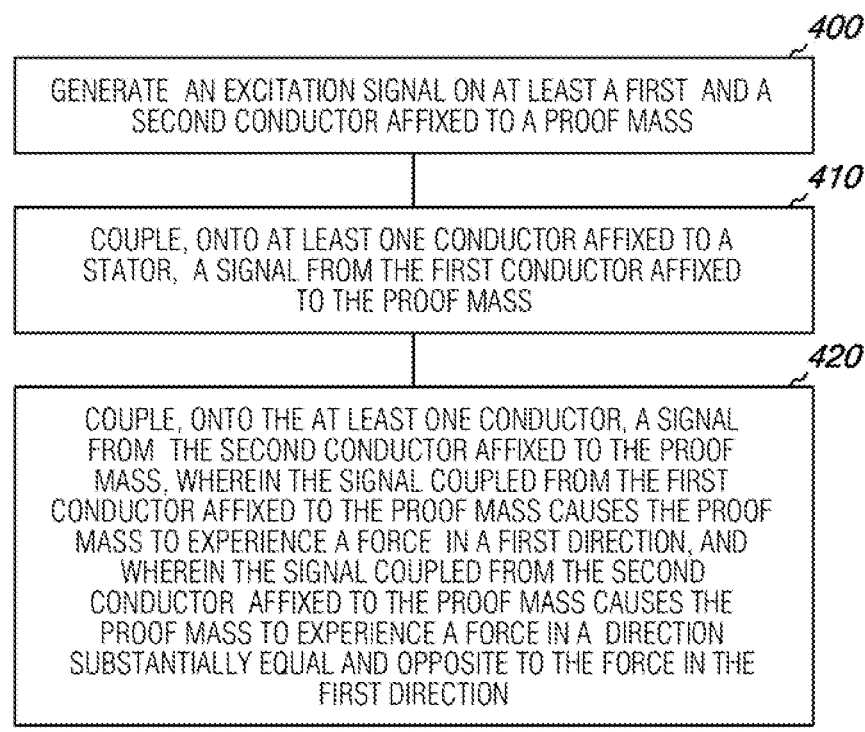
FIG. 10 is a flowchart for a method of error correction in an acceleration sensing device according to an embodiment of the invention.

FIG. 10 is a flowchart for a method of error correction in an acceleration sensing device according to an embodiment of the invention. Although the method FIG. 10 can make use of the device of FIG. 5, nothing prevents the use of numerous alternative structures. The method of FIG. 10 begins at step 400 in which an excitation signal on at least a first and a second conductor affixed to a proof mass is generated. At step 410, a signal from the first conductor affixed to the proof mass is coupled onto at least one conductor affixed to a stator. The method also includes step 420 in which a signal from the second conductor affixed to the proof mass is coupled onto the at least one conductor. In step 420, the signal coupled from the first conductor affixed to the proof mass causes the proof mass to experience a force in a first direction. Also in step 420, the signal coupled from the second conductor affixed to the proof mass causes the proof mass to experience a force in a direction substantially equal and opposite to the force in the first direction.

In conclusion, while the present invention has been particularly shown and described with reference to various embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. An acceleration-sensing device having error correction, comprising:
    a stator having at least one conductor affixed to a surface; and
    a proof mass having a first conductor affixed at a first location relative to the at least one conductor affixed to a surface of the stator, the proof mass having a second conductor affixed at a second location relative to the at least one conductor affixed to a surface of the stator, wherein
    an excitation signal applied to the first conductor of the proof mass brings about a force on the proof mass in the plane of motion of the proof mass that is substantially equally opposed by a force resulting from the excitation signal applied to the second conductor of the proof mass in the plane of motion of the proof mass.

2. The acceleration-sensing device of claim 1, wherein the excitation signal is a periodic waveform, and wherein acceleration is measured by way of determining the amplitude of a signal induced by the excitation signal on the at least one conductor affixed to a surface of the stator.

3. The acceleration-sensing device of claim 2, where in the excitation signal is a sinusoidal waveform.

4. The acceleration-sensing device of claim 1, wherein the first conductor and the second conductor of the proof mass are located at a first side of a gap, and wherein the at least one conductor affixed to a surface of the stator is positioned at a second side of the gap.

5. The acceleration-sensing device of claim 4, wherein the plane of motion of the proof mass moves is lengthwise relative to the gap.

6. The acceleration-sensing device of claim 4, wherein the ratio of the inter-conductor spacing to the gap width approximates 1.

7. The acceleration-sensing device of claim 1, further comprising at least one spring that generates a restoring force to return the proof mass to a neutral position under quiescent conditions.

8. A method of correcting an error in an acceleration-sensing device, comprising:
    generating an excitation signal on at least a first and a second conductor affixed to a proof mass;
    coupling, onto at least one conductor affixed to a stator, a signal from the first conductor affixed to the proof mass; and
    coupling, onto the at least one conductor, a signal from the second conductor affixed to the proof mass, wherein
    the signal coupled from the first conductor affixed to the proof mass causes the proof mass to experience a force in a first direction in a plane of motion of the proof mass, and wherein
    the signal coupled from the second conductor affixed to the proof mass causes the proof mass to experience a force in a direction substantially equal and opposite to the force in the first direction.

9. The method of claim 8, wherein the signal coupled from the first conductor affixed to the proof mass induces a first current on the at least one conductor affixed to the stator, and wherein
    the signal coupled from the second conductor affixed to the proof mass induces a second current on the at least one conductor affixed to the stator.

10. The method of claim 8, wherein the signal from the first conductor affixed to the proof mass and wherein the signal from the second conductor affixed to the proof mass are coupled across an approximately 1μ gap to the stator.

11. The method of claim 10, wherein the first direction is perpendicular to the gap.

12. The method of claim 11, wherein the force in the first direction is brought about by an electric field that acts between the first conductor affixed to the proof mass and the at least one conductor affixed to the stator.

13. The method of claim 8, wherein the excitation signal is a sinusoidal waveform, and wherein the method further comprises demodulating signals from the at least one conductor to determine the acceleration undergone by the proof mass.

14. The method of claim 8, wherein the excitation signal is a square wave, and wherein the method further comprises demodulating signals from the at least one conductor to determine the acceleration undergone by the proof mass.

15. The method of claim 14, further comprising restoring the proof mass to a quiescent position when the proof mass is not undergoing acceleration and when the excitation signal has been removed.

* * * * *